United States Patent
Motil

(10) Patent No.: US 12,423,417 B2
(45) Date of Patent: *Sep. 23, 2025

(54) SECURITY-ADAPTIVE CODE EXECUTION

(71) Applicant: Microsoft Technology Licensing, LLC, Redmond, WA (US)

(72) Inventor: Kirill Motil, Petach Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,060

(22) Filed: Oct. 9, 2023

(65) Prior Publication Data
US 2024/0037222 A1 Feb. 1, 2024

Related U.S. Application Data

(63) Continuation of application No. 16/291,058, filed on Mar. 4, 2019, now Pat. No. 11,847,207.

(51) Int. Cl.
*G06F 21/54* (2013.01)
*G06F 21/55* (2013.01)
*G06F 21/57* (2013.01)

(52) U.S. Cl.
CPC ............ *G06F 21/54* (2013.01); *G06F 21/552* (2013.01); *G06F 21/57* (2013.01)

(58) Field of Classification Search
CPC ......... G06F 21/54; G06F 21/552; G06F 21/57
See application file for complete search history.

(56) References Cited

U.S. PATENT DOCUMENTS

| | | | |
|---|---|---|---|
| 7,290,175 B1 * | 10/2007 | Kessler | G06F 11/0778 714/37 |
| 2003/0028515 A1 * | 2/2003 | Nishikado | H04L 67/564 |
| 2018/0189086 A1 * | 7/2018 | Queva | G06F 8/49 |
| 2019/0205526 A1 * | 7/2019 | Boulton | G06F 18/2431 |
| 2020/0125717 A1 * | 4/2020 | Wang | H04L 9/0877 |

OTHER PUBLICATIONS

Ying-Dar Lin • Huan-Yun Wei • Shao-Tang Yu; Building an integrated security gateway: Mechanisms, performance evaluations, implementations, and research issues; IEEE Communications Surveys & Tutorials (vol. 4, Issue: 1, 2002, pp. 2-15); (Year: 2002).*

(Continued)

*Primary Examiner* — Luu T Pham
*Assistant Examiner* — Chao Wang
(74) *Attorney, Agent, or Firm* — Wade IP Law PLLC

(57) ABSTRACT

A system includes calling to a first function, determination, in response to the call, of whether to execute a first version of the first function or a second version of the first function, execution of the first version of the first function if it is determined to execute the first version of the first function, and execution of the second version of the second function if it is determined to execute the second version of the first function, wherein the second version of the first function comprises a security-related features and the first version of the first function does not comprise the security-related feature.

20 Claims, 7 Drawing Sheets

(56) References Cited

OTHER PUBLICATIONS

Sebastian Zander • Grenville Armitage • Philip Branch; A survey of covert channels and countermeasures in computer network protocols; IEEE Communications Surveys & Tutorials (vol. 9, Issue: 3, 2007, pp. 44-57); (Year: 2007).*

Kai Lehniger • Peter Langendorfer; StackSpecter: Detecting Stack Buffer Overflows for the Xtensa Architecture; 2024 34th International Telecommunication Networks and Applications Conference (ITNAC) (2024, pp. 1-7); (Year: 2024).*

* cited by examiner

SECURITY-ADAPTIVE CODE EXECUTION

CROSS-REFERENCE TO RELATED APPLICATION(S)

This application is a continuation of U.S. patent application Ser. No. 16/291,058, filed Mar. 4, 2019 and entitled "Security-Adaptive Code Execution," the entirety of which is incorporated herein by reference.

BACKGROUND

Attacks on computing systems are commonplace and take many forms. For example, an attacker may gain unauthorized access to a system and acquire private data stored therein and/or inject malware to invade, damage, or disable the system. In view of this threat, modern computing systems are typically designed to include various security features.

Since security features consume system resources, a trade-off exists between strength of security and system performance. Consequently, strong security features may consume an unacceptable amount of system resources if implemented in a low-resource embedded system or in a performance-critical system. Many of such systems are therefore designed with no security or with weak security. In a specific example, software functions written for such a system may include few or no security checks.

Systems are desired to provide improved security in resource-constrained environments.

DETAILED DESCRIPTION

The following description is provided to enable any person in the art to make and use the described embodiments. Various modifications, however, will remain readily-apparent to those in the art.

Some embodiments provide selective execution of two versions of a given software-implemented function. One version is a low- or no-security version of the function, which the other version is a higher-security version of the function. The higher-security function is selectively called based on evaluated criteria. Accordingly, certain security features are invoked sometimes (i.e., during some executions of the given function) and are not invoked at other times (i.e., during other executions of the given function). Embodiments may therefore consume fewer resources than a system in which the higher-security version of the function is always executed, while still occasionally providing the security features of the higher-security version of the function.

Figure 1:
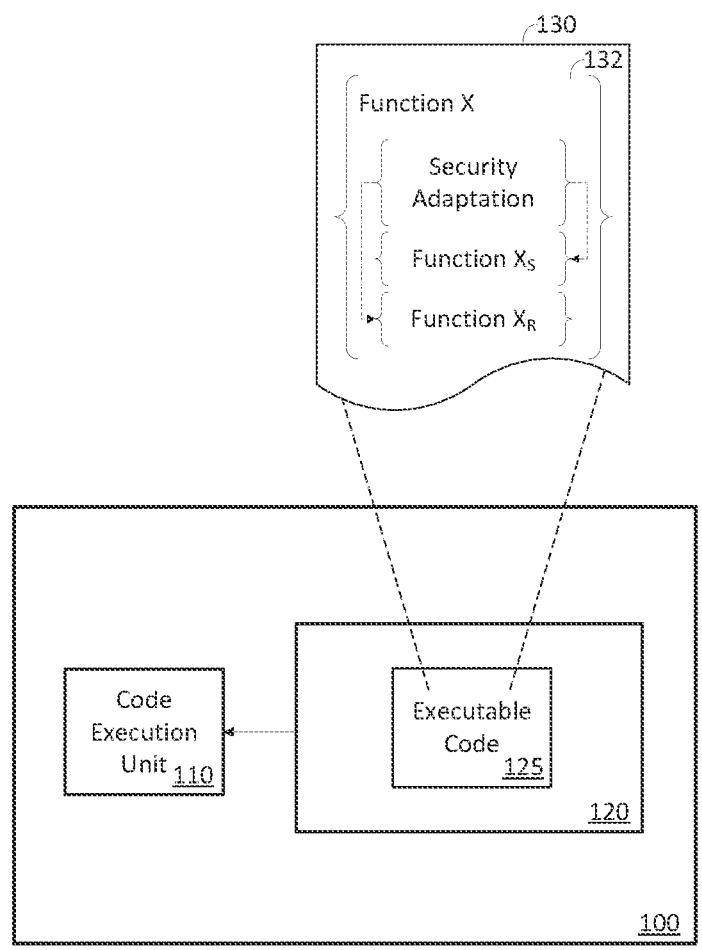
FIG. 1 is a block diagram of a platform executing code to provide adaptive security according to some embodiments.

FIG. 1 is a block diagram of a system according to some embodiments. Platform 100 includes code execution unit 110 and memory 120 storing executable code 125. Platform 100 may comprise any type of computing platform for executing code that is or becomes known. Platform 100 may include any number of other devices, peripherals, integrated circuits, discrete circuits, and mechanical elements (e.g., cooling elements and interconnects) as is known.

Code execution unit 110 may comprise a central processing unit, a processing core, a processing thread, or any other entity to execute machine code. Code execution unit 110 executes executable code 125 to perform functions embodied therein.

Executable code 125 may comprise machine code which is directly executable by code execution unit 110. In some embodiments, code 125 comprises pre-compiled higher-level code which is subjected to Just-in-Time compiling prior to execution by code execution unit 110 as is known in the art.

FIG. 1 illustrates portion 130 of executable code 125 according to some embodiments. The contents of portion 130 are depicted symbolically to provide an understanding of the machine code represented thereby. As depicted, portion 130 includes code 132 to execute Function X. Accordingly, code 132 is executed if Function X is called during execution of another portion of code 125 by code execution unit 110. Function X may be called with input parameters as is known in the art.

Code 132 includes code of three functions: a Security Adaptation function; Function $X_S$; and Function $X_R$. Generally, Function $X_R$ and Function $X_S$ both perform Function X, and Function $X_S$ performs Function X in a more secure manner than Function $X_R$. For example, Function $X_S$ may provide one or more of stack cookie protection, extended checks, extended logging, and secure function analogs that include buffers size checks. Function $X_S$ may provide any other security features/methods/techniques that are or become known.

Function $X_R$ may provide some or no security features. In some embodiments, Function $X_R$ consumes fewer processing resources than Function $X_S$.

The Security Adaptation function determines whether to perform Function $X_S$ or Function $X_R$ in response to a call to Function X. Accordingly, a call to Function X results in execution of Function $X_S$ some of the time and execution of Function $X_R$ at other times. Embodiments may therefore provide higher security at the cost of more processing resources during some executions of Function X and lower security and less resource consumption during other executions of Function X.

The determination of whether to execute Function $X_S$ or Function $X_R$ may be based on any one or more suitable criteria. In some non-exhaustive examples, the determination may be based on a counter (e.g., Function $X_S$ is performed once for every 100 calls to Function X), based on a statistical mechanism (e.g., Function $X_S$ is performed each time bits x, y and z are enabled in the packet checksum), based on a performance metric (e.g., Function $X_S$ is performed if the amount of free computation resources is above a given threshold), and/or based on a security profile of the input/environment (e.g., Function $X_S$ is performed if the determined security risk is above a given threshold).

According to some embodiments, Function $X_S$ performs Function X in a different, but not necessarily more secure, manner than Function $X_R$. In a non-limiting example, Function $X_S$ may perform Function X and also provide debug functionality, while Function $X_R$ simply performs Function X. In such an embodiment, the Adaptation function is a Debug Adaptation function which may determine whether Function X should be performed with debug functionality and pass control to either Function $X_R$ or Function $X_S$ based on the determination.

Figure 2:
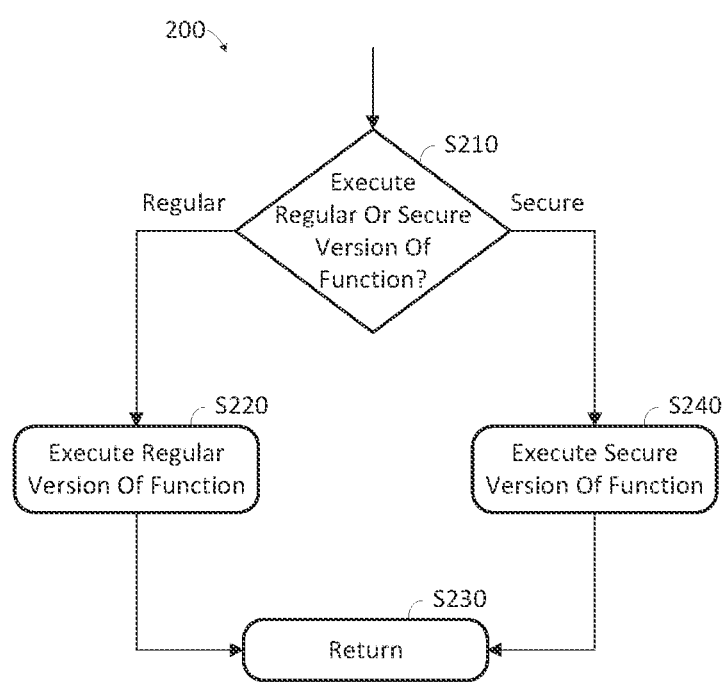
FIG. 2 is a flow diagram of a process to provide adaptive security according to some embodiments.

FIG. 2 is a flow diagram of process 200 to provide adaptive execution of a secure function according to some embodiments. Process 200 and the other processes described herein may be performed using any suitable combination of hardware or software. Executable code embodying these processes may be executed by a central processing unit of a microprocessor or microcontroller, for example, and may be stored in any non-transitory tangible medium, including a read-only memory, a volatile or non-volatile random access memory, a fixed disk, a DVD, a Flash drive, or a magnetic tape. Embodiments are not limited to the examples described below.

Prior to process 200, it is assumed that a security-adaptive function (e.g., Function X) is called during execution of program code by a code execution unit. Next, at S210, it is determined whether to execute a regular version or a secure version of the function. For purposes of the present description, the regular version of the function is less secure and less resource-consuming than the secure version of the function.

The determination at S210 may be performed by an adaptation function (e.g., the Security Adaptation function of code 132) which is first executed in response to a call to the security-adaptive function. In some embodiments, the determination is performed by the calling function (e.g., if rand(100) call f_regular; else call f_secure).

Flow proceeds to S220 if it is determined at S210 to execute the regular version of the function, based on criteria such as that described above or on other criteria. Accordingly, the regular version of the function (e.g., Function $X_R$) is executed at S220 and program flow returns to the calling function at S230.

The secure version of the function (e.g., Function $X_S$) is executed at S240 if it is determined at S210 to execute the secure version of the function. Flow then returns at S230 as described above.

Figure 3:
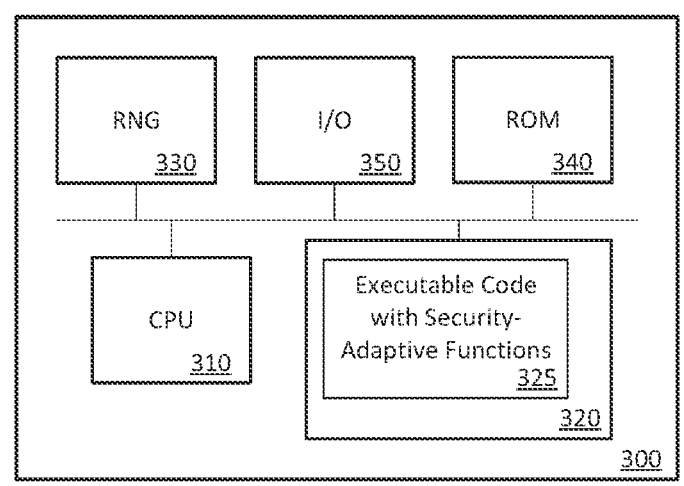
FIG. 3 is a block diagram of an embedded system to execute security-adaptive code according to some embodiments.

FIG. 3 depicts embedded system 300 according to some embodiments. Embedded system 300 may possess limited processing resources. Accordingly, embodiments may provide security to functions executed by system 300 while consuming fewer resources than would otherwise be consumed.

System 300 may comprise a microcontroller including CPU 310, memory 320 storing executable code 325 including one or more security-adaptive functions as described herein, random number generator 330 which may be usable in determining whether to execute a secure version or a regular version of a function, Read Only Memory (ROM) 340 and I/O interface 350. Some embodiments may be implemented in any microcontroller configuration.

According to some embodiments, a developer simply writes source code of a function (e.g., Function X) which includes a regular version of the function (e.g., Function $X_R$), a secure version of the function (e.g., Function $X_S$), and a security adaptation determination (e.g., the Security Adaptation function of Function X) which selectively calls the regular version or the secure version based on the determination. The source code is compiled (along with other source code) to generate corresponding machine-executable code.

Figure 4:
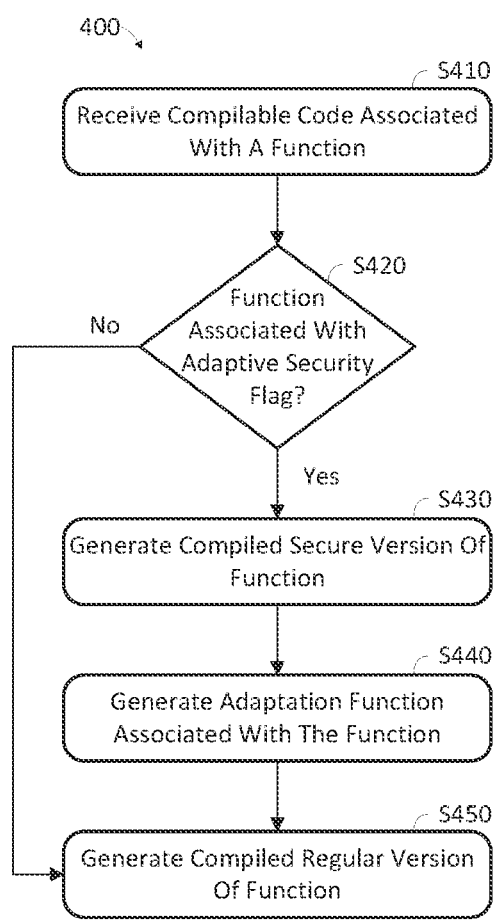
FIG. 4 is a flow diagram of a process to generate security-adaptive code according to some embodiments.

In contrast, FIG. 4 is a flow diagram of process 400 to generate a security-adaptive function using compiler flags according to some embodiments. Prior to process 400, a developer writes compilable source code to execute a function. The developer also associates one or more compiler flags with the function to indicate that the compiler should generate a security-adaptive function based on the source code. The one or more compiler flags may indicate that the security-adaptive function should be generated, and may also indicate one or more security features to include in the secure version of the function, criteria to be used in the determination of whether to execute the regular version or the secure version of the function, and/or other suitable parameters.

Figure 5:
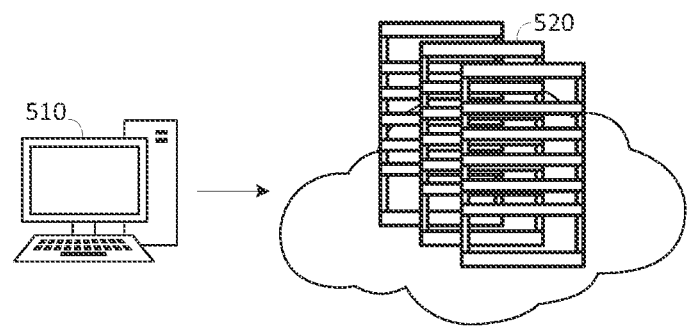
FIG. 5 is a block diagram of a system to generate security-adaptive code according to some embodiments.

FIG. 5 illustrates a cloud-based development environment according to some embodiments. Developer system 510 may communicate with cloud-based integrated development environment 520 to generate the above-mentioned compilable source code. Environment 520 may then execute process 400 based on the source code. The source code may be developed and compiled entirely on system 510 without use of a remote environment such as environment 520 in some embodiments.

Returning to process 400, the compilable code is received by a compiler at S410. During compilation, it is determined at S420 whether the function is associated with a flag indicating that the compiler should generate a security-adaptive function based thereon. If not, flow proceeds to S450 to generate a compiled (e.g., object code) regular version of the function.

If the determination at S420 is affirmative, a compiled secure version of the function is generated at S430. As mentioned above, the source code of the function may be associated with flags indicating security features to be included in the secure version.

An adaptation function associated with the function is generated at S440. The adaptation function may be executed to determine whether to execute the regular version of the function or the secure version of the function. Generation of the adaptation function may be based on compiler flags which specify parameters and/or logic of the determination performed by the adaptation function. A regular version of the function is then generated at S450 as described above.

As noted above, the calling function may determine whether to call the regular version or the secure version of a function in some embodiments. S440 may be omitted in such scenarios (i.e., an adaptation function is not needed).

Figure 6:
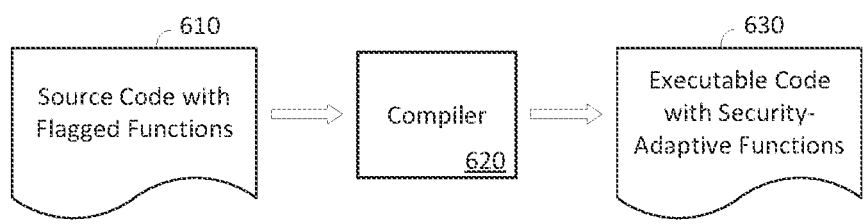
FIG. 6 is a diagram illustrating generation of security-adaptive code according to some embodiments.

FIG. 6 depicts process 400 according to some embodiments. Source code 610 includes on or more functions which are flagged as described. Compiler 620, which may be implemented in any manner that is or becomes known, receives code 610 and generates executable code 630 including security-adaptive functions corresponding to the flagged functions. In some embodiments, compiler 620 generates object code based on code 610 and links the object code with other (unshown) object code to generate executable code 630.

Figure 7:
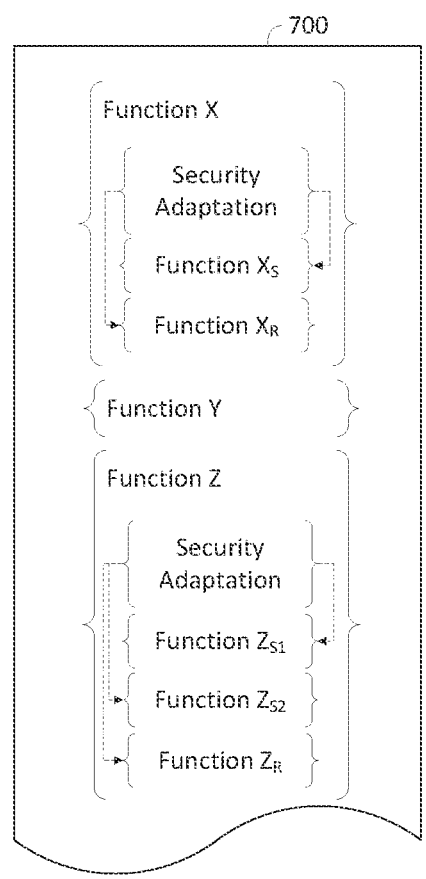
FIG. 7 is a representation of security-adaptive code according to some embodiments.

Code 630 may include one or more security-adaptive functions. FIG. 7 depicts code 700 including more than one security-adaptive functions according to some embodiments. Code 700 includes executable code of Function X, Function Y and Function Z. Function X is a security-adaptive function similar to Function X of FIG. 1. Function Y includes code to perform a single version of Function Y and is therefore not security-adaptive as described herein.

Function Z includes a Security Adaptation function and a regular function (i.e., Function $Z_R$) as described herein. Function Z also includes two secure versions, Function $Z_{S1}$ and Function $Z_{S2}$. Function $Z_{S1}$ and Function $Z_{S2}$ may provide different security features, with one being more secure and more resource-intensive than the other. Function $Z_{S1}$ and Function $Z_{S2}$ may be similarly resource-intensive but provide different security features. The Security Adaptation function of Function Z therefore determines which one of Function $Z_R$, Function $Z_{S1}$ and Function $Z_{S2}$ to execute in response to a call to Function Z.

Figure 8:
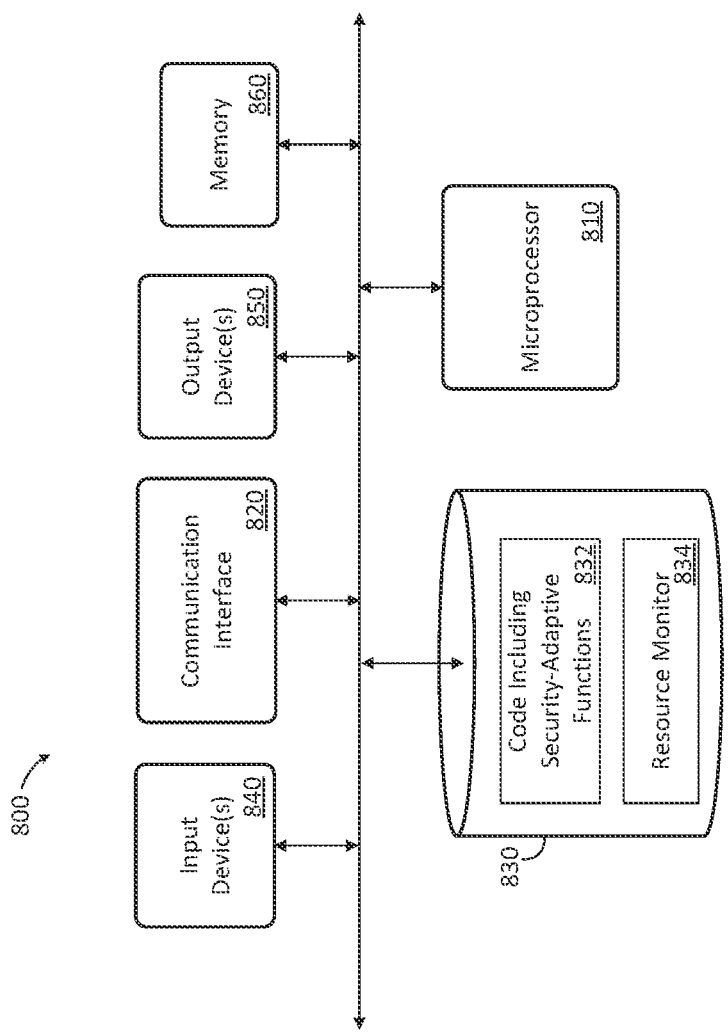
FIG. 8 is a block diagram of a system to execute security-adaptive code according to some embodiments.

FIG. 8 is a block diagram of computing system 800 to execute code including security-adaptive functions as described herein. System 800 may comprise a general-purpose computer. For example, system 800 may comprise a computer implementing platform 100 in some embodiments.

System 800 includes microprocessor 810 operatively coupled to communication device 820, persistent data storage system 830, one or more input devices 840, one or more output devices 850 and volatile memory 860. Microprocessor 810 may comprise one or more processors, processing cores, etc. for executing program code. Communication interface 820 may facilitate communication with external devices, such as networked devices. Input device(s) 840 may comprise, for example, a keyboard, a keypad, a mouse or other pointing device, a microphone, a touch screen, and/or an eye-tracking device. Output device(s) 850 may comprise, for example, a display (e.g., a display screen), a speaker, and/or a printer.

Data storage system 830 may comprise any number of appropriate persistent storage devices, including combinations of magnetic storage devices (e.g., magnetic tape, hard disk drives and flash memory), optical storage devices, Read Only Memory (ROM) devices, etc. Memory 860 may comprise Random Access Memory (RAM), Storage Class Memory (SCM) or any other fast-access memory.

Data storage system 830 stores code 832 including security-adaptive functions. Code 832 may comprise a software application providing any functionality that is or becomes known. Resource monitor 834 may comprise code executable to monitor system resources. Such monitoring may be used by code 832 to determine whether to execute a regular or a secure version of a function. Data storage device 830 may store code of other software applications, which do or do not include security-adaptive functions as described herein. Data storage device 830 may also store data and other program code for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
a memory storing executable code; and
a hardware processor to execute the code to:
call a function a first time;
based on the function being called the first time, determine a value of an attribute at a first time instance, the value of the attribute at the first time instance indicating at least one of a first amount of computation resources of the system that is free at the first time instance, a first security risk associated with the system at the first time instance, or that a designated bit of a packet checksum is not enabled at the first time instance;
based on a first criterion being satisfied, execute a first version of the function that does not comprise a security feature rather than a second version of the function that comprises the security feature, wherein the security feature comprises a function of at least one of stack cookie protection, extended logging, or a buffer size check, and wherein the first criterion being satisfied indicates at least one of the first amount of the computation resources of the system that is free at the first time instance is less than or equal to a first threshold value, the first security risk associated with the system at the first time instance is less than or equal to a second threshold value, or the designated bit of the packet checksum is not enabled at the first time instance;
call the function a second time;
based on the function being called the second time, determine the value of the attribute at a second time instance that follows the first time instance, the value of the attribute at the second time instance indicating at least one of a second amount of the computation resources of the system that is free at the second time instance, a second security risk associated with the system at the second time instance, or that the designated bit of the packet checksum is enabled at the second time instance;
based on a second criterion being satisfied, determine whether to execute the second version of the function, which comprises the security feature, or a third version of the function, which comprises a second security feature that is different from the security feature, wherein the second security feature comprises a function of at least one of the stack cookie protection, the extended logging, or the buffer size check, and wherein the second criterion being satisfied indicates at least one of the second amount of the computation resources of the system that is free at the second time instance is greater than the first threshold value, the second security risk associated with the system at the second time instance is greater than the second threshold value, or the designated bit of the packet checksum is enabled at the second time instance; and
based on the second criterion being satisfied and further based on a determination that the second version of the function, rather than the third version of the function, is to be executed, execute the second version of the function that comprises the security feature rather than the first version of the function that does not comprise the security feature.

2. The system of claim 1, wherein the security feature comprises the function of the extended logging.

3. The system of claim 1, wherein the hardware processor executes the code to:
   call a second function a first time;
   based on the second function being called the first time, determine a third amount of the computation resources of the system that is free at a third time instance;
   based on the third amount of the computation resources of the system that is free at the third time instance not exceeding a third threshold value, execute a first version of the second function that does not comprise a second security feature rather than a second version of the second function that comprises the second security feature;
   call the second function a second time;
   based on the second function being called the second time, determine a fourth amount of the computation resources of the system that is free at a fourth time instance that follows the third time instance; and
   based on the fourth amount of the computation resources of the system that is free at the fourth time instance exceeding the third threshold value, execute the second version of the second function that comprises the second security feature rather than the first version of the second function that does not comprise the second security feature.

4. The system of claim 3, wherein the hardware processor executes the code to:
   call a third function; and
   in response to the call to the third function, determine whether to execute a first version of the third function, a second version of the third function, or a third version of the third function,
   wherein the third version of the third function comprises a first set of security-related features, the second version of the third function comprises a second set of security-related features that is different from the first set of security-related features, and the first version of the third function comprises neither the first set of security-related features nor the second set of security-related features.

5. The system of claim 1, wherein the second version of the function provides debug functionality.

6. The system of claim 1, wherein the second version of the function is more secure and more resource-consuming than the first version of the function.

7. The system of claim 1, wherein the security feature comprises the function of the buffer size check.

8. The system of claim 1, wherein the second version of the function and the third version of the function provide different security features.

9. A method comprising:
   calling a function a first time;
   based on the function being called the first time, determining a value of an attribute at a first time instance, the value of the attribute at the first time instance indicating at least one of a first amount of computation resources of a system that is free at the first time instance, a first security risk associated with the system at the first time instance, or that a designated bit of a packet checksum is not enabled at the first time instance;
   based on a first criterion being satisfied, executing a first version of the function that does not comprise a security feature rather than a second version of the function that comprises the security feature, wherein the security feature comprises a function of at least one of stack cookie protection, extended logging, or a buffer size check, and wherein the first criterion being satisfied indicates at least one of the first amount of the computation resources of the system that is free at the first time instance is less than or equal to a first threshold value, the first security risk associated with the system at the first time instance is less than or equal to a second threshold value, or the designated bit of the packet checksum is not enabled at the first time instance;
   calling the function a second time;
   based on the function being called the second time, determining the value of the attribute at a second time instance that follows the first time instance, the value of the attribute at the second time instance indicating at least one of a second amount of the computation resources of the system that is free at the second time instance, a second security risk associated with the system at the second time instance, or that the designated bit of the packet checksum is enabled at the second time instance;
   based on a second criterion being satisfied, determining whether to execute the second version of the function, which comprises the security feature, or a third version of the function, which comprises a second security feature that is different from the security feature, wherein the second security feature comprises a function of at least one of the stack cookie protection, the extended logging, or the buffer size check, and wherein the second criterion being satisfied indicates at least one of the second amount of the computation resources of the system that is free at the second time instance is greater than the first threshold value, the second security risk associated with the system at the second time instance is greater than the second threshold value, or the designated bit of the packet checksum is enabled at the second time instance; and
   based on the second criterion being satisfied and further based on a determination that the second version of the function, rather than the third version of the function, is to be executed, executing the second version of the function that comprises the security feature rather than the first version of the function that does not comprise the security feature.

10. The method of claim 9, wherein the security feature comprises the function of at least one of the extended logging or the buffer size check.

11. The method of claim 9, further comprising:
    calling a second function a first time;
    based on the second function being called the first time, determining a third security risk associated with the system at a third time instance;
    based on the third security risk associated with the system at the third time instance not exceeding a third threshold value, executing a first version of the second function that does not comprise a second security feature rather than a second version of the second function that comprises the second security feature;
    calling the second function a second time;
    based on the second function being called the second time, determining a fourth security risk associated with the system at a fourth time instance that follows the third time instance; and
    based on the fourth security risk associated with the system at the fourth time instance exceeding the third threshold value, executing the second version of the second function that comprises the second security feature rather than the first version of the second function that does not comprise the second security feature.

12. The method of claim 11, further comprising:
calling a third function; and
in response to calling the third function, determining whether to execute a first version of the third function, a second version of the third function, or a third version of the third function,
wherein the third version of the third function comprises a first set of security-related features, the second version of the third function comprises a second set of security-related features that is different from the first set of security-related features, and the first version of the third function comprises neither the first set of security-related features nor the second set of security-related features.

13. The method of claim 9, wherein the second version of the function provides debug functionality.

14. The method of claim 9, wherein the second version of the function is more secure and more resource-consuming than the first version of the function.

15. The method of claim 9, wherein the second version of the function and the third version of the function provide different security features.

16. The method of claim 9, wherein the first version of the function and the second version of the function are executed using hardware.

17. A non-transitory computer-readable medium storing executable code, the code executable by a processing unit of a computing system to cause the computing system to:
call a function a first time;
based on the function being called the first time, determine a value of an attribute at a first time instance, the value of the attribute at the first time instance indicating at least one of a first amount of computation resources of a system that is free at the first time instance, a first security risk associated with the system at the first time instance, or that a designated bit of a packet checksum is not enabled at the first time instance;
based on a first criterion being satisfied, execute a first version of the function that does not comprise a security feature rather than a second version of the function that comprises the security feature, wherein the security feature comprises a function of at least one of stack cookie protection, extended logging, or a buffer size check, and wherein the first criterion being satisfied indicates at least one of the first amount of the computation resources of the system that is free at the first time instance is less than or equal to a first threshold value, the first security risk associated with the system at the first time instance is less than or equal to a second threshold value, or the designated bit of the packet checksum is not enabled at the first time instance;
call the function a second time;
based on the function being called the second time, determine the value of the attribute at a second time instance that follows the first time instance, the value of the attribute at the second time instance indicating at least one of a second amount of the computation resources of the system that is free at the second time instance, a second security risk associated with the system at the second time instance, or that the designated bit of the packet checksum is enabled at the second time instance;
based on a second criterion being satisfied, determine whether to execute the second version of the function, which comprises the security feature, or a third version of the function, which comprises a second security feature that is different from the security feature, wherein the second security feature comprises a function of at least one of the stack cookie protection, the extended logging, or the buffer size check, and wherein the second criterion being satisfied indicates at least one of the second amount of the computation resources of the system that is free at the second time instance is greater than the first threshold value, the second security risk associated with the system at the second time instance is greater than the second threshold value, or the designated bit of the packet checksum is enabled at the second time instance; and
based on the second criterion being satisfied and further based on a determination that the second version of the function, rather than the third version of the function, is to be executed, execute the second version of the function that comprises the security feature rather than the first version of the function that does not comprise the security feature.

18. The non-transitory computer-readable medium of claim 17, wherein the security feature comprises the function of at least one of the extended logging or the buffer size check.

19. The non-transitory computer-readable medium of claim 17, the code executable by a processing unit of a computing system to cause the computing system to:
call a second function a first time;
based on the second function being called the first time, determine that the designated bit of the packet checksum is not enabled at a third time instance;
based on the designated bit of the packet checksum not being enabled at the third time instance, execute a first version of the second function that does not comprise a second security feature rather than a second version of the second function that comprises the second security feature;
call the second function a second time;
based on the second function being called the second time, determine that the designated bit of the packet checksum is enabled at a fourth time instance that follows the third time instance; and
based on the designated bit of the packet checksum being enabled at the fourth time instance, execute the second version of the second function that comprises the second security feature rather than the first version of the second function that does not comprise the second security feature.

20. The non-transitory computer-readable medium of claim 17, wherein the security feature comprises the function of the stack cookie protection.

* * * * *